May 22, 1962  J. WATKINS ETAL  3,035,437
COMPRESSIBILITY TESTER
Filed July 10, 1958

JACK WATKINS
VINCENT S. SKINNER
INVENTORS

BY *Browning, Simms,*
*Hyer & Eickenroht*

ATTORNEYS

United States Patent Office 3,035,437
Patented May 22, 1962

3,035,437
COMPRESSIBILITY TESTER
Jack Watkins and Vincent S. Skinner, Houston, Tex., assignors of thirty-three and one-third percent to Engineers Testing Laboratory, Inc., Houston, Tex.
Filed July 10, 1958, Ser. No. 747,740
2 Claims. (Cl. 73—94)

This invention relates to testing apparatus and particularly to that type of apparatus suitable for subjecting soil samples or the like to compression tests extending over a period of days, or even weeks.

In conducting this type of test it is essential that the soil samples be subjected to exact load conditions, that the force applied to them be never decreased and it be maintained free from jarring, overloading or even momentary loss of load.

Devices for accomplishing such tests in the past have been generally in the nature of mechanical lever-arm type of force applying mechanisms in which the force to be applied to a soil sample is applied by means of the short end of a lever arm, the long end of which is loaded with weights of such value as, taken with the mechanical advantage of the lever arm, will apply the desired compressive force to the soil sample. Such a mechanism has definite limitations because of the necessary increase in size as the mechanical advantage of the device is increased in order to apply greater and greater loads to the soil sample, the size of the device becomes so great as to be cumbersome and the problem of providing a friction-free pivotal support for the lever arm is not easily overcome. Furthermore, the matter of loading such a lever arm without jarring or causing overloading of the soil sample is a very difficult operation and such mechanisms have definitely not solved the problem of providing a suitable compressibility tester.

It is an object of this invention to provide a compressibility tester in which the utilization of a long lever arm with its attendant limitations and difficulties is completely avoided.

Another object of this invention is to provide a tester in which loads may be added in any amount without any danger whatsoever of jarring the soil sample or the load applied to it and without any danger of either overloading it or loss of load at any time.

Another object of this invention is to provide such a tester in which the degree of compressibility of the soil sample may be ascertained at any time by a visual indicator.

Another object of this invention is to provide a hydraulic tester for the purpose above mentioned which will be substantially friction free and in which the leakage will be held below an amount which will require attention for a period of twelve hours or more under the heaviest loading conditions.

Another object of this inveniton is to provide a hydraulic tester for the purpose above indicated in which any leakage of hydraulic fluid may be replaced without disturbing the test being conducted and without any loss of load or jarring of the test.

Other objects and advantages of this invention will become apparent from the following description taken in connection with the accompanying drawings wherein one embodiment of the invention is set forth by way of illustration and example.

Figure 1:
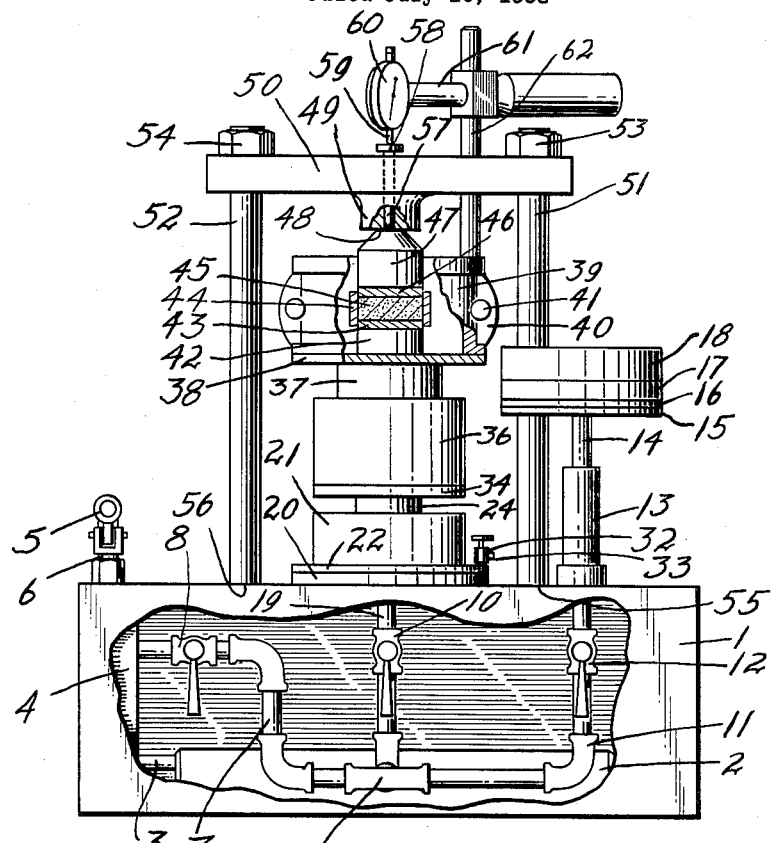
FIG. 1 is a side elevation of a tester constructed in accordance with this invention, parts being broken away and shown in section for purpose of illustration.

In general, this invention achieves its various objects by the provision of a hydraulic system in which a hydraulic ram-type motor is provided in the form of a piston or plunger with a large effective area as subject to the hydraulic pressure. This piston or plunger serves to apply the necessary compressing force to one of the test sample rams. The hydraulic pressure is provided by means of a piston and cylinder of a relatively very small effective area. The movable element of this pair is provided with means for loading it with weights of suitable size so that the downward action of gravity on such weights, and hence on the movable element of the piston and cylinder pair, will serve to apply sufficient hydraulic pressure to the hydraulic fluid in the system to act through the large effective area on the hydraulic motor with the desired force against the test sample. Such an arrangement as this can be set up in a relatively small space, much smaller than that required for a mechanical lever-type of force applying mechanism. It eliminates entirely the problem of providing a sufficiently strong, substantially friction-free pivot for a large lever carrying tremendous forces. Leakage has been prevented from the large area hydraulic motor by confining the fluid pressure therein by a flexible diaphragm against which the movable element of this motor bears, and means has been provided for removing all air from underneath such a diaphragm in order that there will be no sponginess or uncertainty in the load being applied to the test sample. In connection with the means for applying force to the hydraulic fluid, this is in the nature of an accumulator as above set forth and leakage from this element is minimized by accuracy of fitting and by selection of a fluid which, though of low viscosity, has favorably low leakage characteristics by virtue of the presence therein of a high molecular weight isobutylene polymer.

Provision is made for adding weights to the mechanism which applies the hydraulic force to the hydraulic fluid while avoiding jarring or applying sudden forces to the test sample, by means of a shut-off valve between the accumulator and the hydraulic motor. By shutting off such a valve and hence closing communication between these two portions of the device, additional weight may be applied to the accumulator without affecting the force being applied by the hydraulic motor, and then when the valve is opened very gradually after the additional weight is in place, the force applied by the hydraulic motor will increase smoothly and without jarring. Provision is also made for compensating for any leakage of hydraulic fluid without interrupting a test, a thing which in the past has inhibited the use of hydraulic mechanisms for this purpose, by means of a valve such as above mentioned which temporarily cuts off communication between the accumulator and the hydraulic motor, and by means for at that time supplying increased fluid to the accumulator to raise the level of the weight carrying portion thereof by such amount as may be desired. After this has been done the communication between the fluid supplying mechanism just mentioned and the accumulator is shut off and that between the accumulator and the fluid motor is opened so that the accumulator again applies the fluid pressure directly to the fluid motor.

Referring more in detail to the drawings, the base of this tester is exemplified by the numeral 1 which is in the form of a housing containing a fluid reservoir 2 for carrying a reserve supply of the hydraulic fluid utilized in this system. This fluid reservoir 2 is connected by means of a conduit 3 to a pump 4 capable of supplying pressure above the highest pressure that the device is ever intended to supply. This pump 4 is adapted to be actuated by means of a handle 5 operating a plunger 6. Of course, any desired form of pump for supplying fluid under high pressure to the system may be employed.

The pump 4 is connected by means of a conduit 7 through a cutoff valve 8 to a T-fitting 9 through which fitting the pump is connected to the hydraulic force applying system and through which the accumulator and fluid motor are connected to each other.

The T-fitting 9 is connected through a valve 10 to the hydraulic motor as will be presently described, and through an elbow 11 and a cutoff valve 12 to the accumulator.

The accumulator is in the form of a stationary cylinder 13 carried on the base 1 and a plunger 14 closely fitted therein and carrying a platform 15 for the support of suitable weights such as 16, 17 and 18. The fit between the cylinder 13 and the plunger 14 is a honed fit and is made as close as possible while permitting the plunger 14 to fall without substantial friction within the cylinder 13. Of course, it will be appreciated that in some instances it may be found desirable to mount the piston or plunger in the stationary position and permit the cylinder to move with the weight platform 15.

Figure 2:
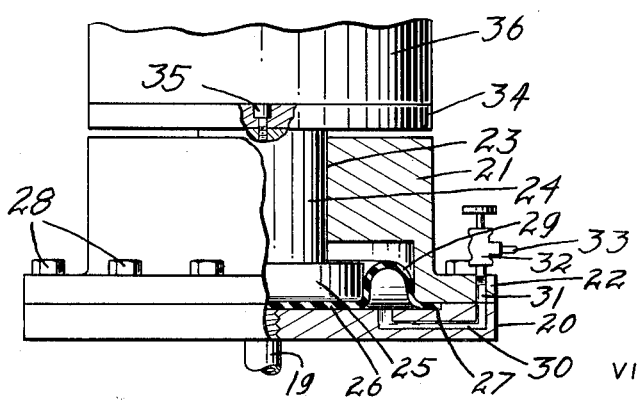
FIG. 2 is a fragmentary enlargement of a portion of FIG. 1, shown partly in side elevation and partly in vertical cross-section and illustrating the hydraulic motor by which the testing force is directly applied to a test sample ram.

The cutoff valve 10 previously mentioned is connected through a pipe 19 to the hydraulic motor base 20 and through this pipe and an opening in said base communicates with the upper surface of the base as illustrated more in detail in FIG. 2. The housing 21 of this hydraulic motor is provided with a flange 22 which mates about its outer edge with the outer edge portion of the motor base 20 and which has a central opening through its upper portion as shown at 23 designed to loosely receive the plunger 24 forming the movable element of the hydraulic motor. This plunger 24 has a head 25 on its lower end, the area of the lower surface of this head plus some overhang of the diaphragm 26 determining the effective area of this movable element of the hydraulic motor. This head bears on its lower surface against the diaphragm 26 which is a very flexible diaphragm and is gripped along its outer margin 27 between the base 20 and the flange 22 of the housing 21. This gripping is effected by the clamping action of the bolts or screws 28 by which the flange 22 is clamped against the base 20. The diaphragm is provided with fullness around its outer margin as shown at 29 so as to permit the maximum movement of the plunger 24. This diaphragm being impervious to the hydraulic fluid obviously prevents any leakage from the system through the hydraulic motor. The forces exerted by this hydraulic motor being extremely large, the minor effects of friction and resistance to movement of the flexible diaphragm will be practically negligible.

However, it is highly desirable that all air or gaseous matter be removed from the hydraulic motor so that the load exerted thereby may be accurately produced without sponginess, and means is provided for exhausting all the air or the like from beneath the diaphragm 29. This means in the form illustrated comprises the passageway 30 which preferably opens into the space beneath the diaphragm 29 underneath the fullness adjacent the outer margin thereof, and which emerges from the base 20 through an opening in its upper surface and through a passageway 31 through the flange 22. A suitable valve 32 connects to the upper end of the passageway 31 and provides a connection 33 to which a suitable vacuum pump may be attached for the purpose of aspirating the space beneath the diaphragm 26 at the fullness 29. By this means all air may be evacuated from beneath the diaphragm 29.

Carried on the upper end of the plunger 24 and secured thereon by means of a screw 35 or the like is a platform 34 on which in the present instance is mounted a counterweight 36 for counterbalancing the weight effect of the plunger 14 and the platform 15 of the accumulator. Mounted on this counterweight 36 is a spacer 37 on which the plate 38 is carried in centered position, the centering being secured by any desirable well-known means. The plate 38 forms part of a water jacket, the sides of this jacket being provided by semicircular housing sections 39 having flanges at their diametrically opposed points as shown at 40 so that they may be secured together by bolts or the like 41. The lower surface of this housing is merely allowed to rest on the plate 38 but is sealed thereto with a water-tight seal by suitable means such as petroleum jelly or the like. The upper end of this water jacket may remain open as its purpose is merely to provide a water bath for the test sample during the testing operation.

For the purpose of actually and directly applying the test force to the test sample a movable ram 42 is centered on the plate 38 and bears against a porous stone spacer 43 which is of such a size that it will just fit within the sample retainer ring 44. The test sample 45 fits within the retainer ring 44 and rests upon the porous stone 43. The second porous stone 46 is placed upon the sample and is of such a size to just enter the upper end of the ring 44. Against this second porous stone is the stationary test sample ram 47 bearing at 48 against an abutment 49 on a crosshead 50.

The crosshead 50 in turn is carried on a pair of upstanding bars or columns 51 and 52 and is held thereon by means of suitable nuts 53 and 54 or the like. The bars or columns are anchored in suitable fashion at 55 and 56, respectively, to the base 1.

In order to determine and measure the exact amount of movement between the rams 42 and 47 resulting from compression of the test sample 45, the abutment 49 is provided with a central bore in which is received a movable stem 57, preferably with a rounded lower end bearing against the upper end of the ram 47. The upper end of this pin extends beyond the upper surface of the crosshead 50 and has a flat head 58 thereon adapted to receive the movable pin 59 of a dial indicator 60 of well-known type. The dial indicator 60 is carried on a support bar 61 suitably adjustably connected to a vertical support bar 62 so it may be moved thereon and clamped thereon in any desired position by well-known clamping mechanism. The bar 62 is in turn rigidly mounted with respect to the plate 38 on which the movable ram 42 is carried. Thus, it will be seen that upon any compression of the test sample 45 the ram 42 will move upwardly with respect to the ram 47 and this movement will be reflected in an upward movement of the plate 38 and the support column 62 and bar 61, along with the dial indicator 60. Such upward movement will be reflected by the pin 59 moving outwardly with respect to the dial indicator and causing a movement of the indicator hand. The reason for utilizing the pin 57 instead of allowing the dial indicator to bear directly on the crosshead 50 is to make possible an initial dial gage reading prior to the application of the first increment of load, which occurs when the ram 47 engages the crosshead.

In operation, the test sample will be loaded in the position illustrated and the water jacket filled with water to a point that it completely submerges the test sample so that the test sample will always be substantially soaked to the point of saturation with water during the course of the test. The porous stones 43 and 46 permit the free passage of water into the sample.

It will be assumed that the valve 8 in the position illustrated is open and that the valves 10 and 12 in the positions in which they are illustrated are closed.

The test sample having thus been placed and the valve 8 being open the valve 10 may be opened and the pump 4 operated to supply fluid from the reservoir 2 into the hydraulic motor until the ram 47 just engages the abutment 49 on the crosshead 50. A vacuum pump or the like will then be connected through the needle valve 32 and this valve opened while such pump is operated in order to evacuate all air from beneath the diaphragm 26. This should be done first with the valve 10 closed in order that the fullness 29 may be drawn down into engagement with the upper surface of the base 20 and all air withdrawn therefrom rather than for hydraulic fluid to be drawn through the pipe 19 and into the passageway 30 before the air is exhausted from the fullness 29.

The air having been thus exhausted the valve 32 will again be closed and fluid injected into the fluid motor by means of the pump 4 in the manner above described until all of the space between the diaphragm 29 and the base 20 will be filled with hydraulic fluid but without exerting any substantial pressure on the test sample. Once this operation is complete, it is not repeated.

The valve 10 should now be closed and the valve 12 opened so as to connect the pump 4 to the accumulator. Then upon further operation of the pump 4 the accumulator cylinder 13 will be filled with hydraulic fluid raising the plunger 14 and platform 15 to the extent desired. The plunger 14 is provided with a drilled hole through its center for bleeding off trapped air in the accumulator, and is then closed by a suitable means such as a screw or plug. The valve 8 should then be closed to cut off communication between the pump 4 and the accumulator and the valve 10 opened quickly so as to permit communication between the accumulator and the fluid motor.

It should be explained at this point that the valves 10 and 12 are preferably quick opening valves so that the fluid may transfer the pressure to the sample immediately upon opening these valves.

The accumulator and fluid motor being now in full fluid communication with each other and being shut off from the pump 4, the amount of force applied to the test sample will be that portion of the weight of the plunger of the accumulator and any weights placed thereon multiplied by the ratio of the effective area of the plunger 14 to the effective area of the head 25 of the fluid motor. Thus it will be seen that an extremely large amount of force may be applied to the test sample with a relatively very small apparatus by this invention.

When it is desired to add weight to the accumulator in order to increase the force exerted on the sample, one of the valves 10 or 12 will be closed temporarily. This will isolate the fluid motor from the accumulator so that weight may be added to the accumulator without having any effect on the force applied to the fluid motor and for the short period of time involved no leakage will be permitted from the fluid motor or its connections sufficient to permit any reduction of the force applied to the fluid motor. After the desired amount of weight has been added to the accumulator, then the valve 10 or the valve 12, whichever has been closed, will be opened. Inasmuch as weight will have been added to the accumulator, the fluid pressure on the accumulator side of the valve which has been closed will be substantially greater than that on the fluid motor side of such valve and care should be taken in operating the valve to open the valve in a quick, full movement, so that the change in loading of the sample is practically instantaneous but without shock.

It has been found that with most ordinary hydraulic fluids, if the fluid selected has a viscosity low enough so that its friction within the accumulator between the cylinder 13 and plunger 14 will not have too great an effect on the operation of the testing equipment, then such fluid will leak between these parts at such a rate as to require replenishment at fairly short intervals. In order to obviate this shortcoming and make the structure of this invention such as would permit periods of twelve hours or more without attention for the purpose of adding fluid to the system, a search has been made for a fluid which would have sufficiently low viscosity to avoid the adverse frictional effect of a high viscosity fluid in the accumulator 13—14, yet one which would not leak out of the accumulator at such a high rate of speed as ordinary fluids of such viscosity would do. It has been found that a medium rust and oxidation inhibited hydraulic oil having a viscosity of 430 seconds Saybolt at 100° F. may be modified by adding thereto a high molecular weight isobutylene polymer until its viscosity is 500 seconds Saybolt at 100° F. At 210° F. this fluid so modified was found to have a viscosity of 60 seconds Saybolt. The resulting fluid has an API gravity of 26.0°, a color of 10½ Robinson, a pour point of minus 10° F., and a typical flash point of 415° F. (open cup). This hydraulic fluid is now available under the trade name of Paratac, being manufactured by the Enjay Company and marketed through the affiliates of the Standard Oil Company of New Jersey.

It will be understood that the essential features of the hydraulic fluid in order to accomplish the improved lower leakage desired are that the viscosity of the base fluid be low enough so that it will not provide excessive friction and thereby interfere with the operation of the tester and particularly the operation of the accumulator, and that sufficient of the high molecular weight polymer be added to lower the leakage characteristics of the fluid to the point that the leakage will be reduced below a predetermined minimum.

This invention also provides for the replenishment of hydraulic fluid in the system comprising the accumulator, the hydraulic motor, and the connections therebetween, without interrupting the test being conducted nor in any way disturbing the test sample. In order to so replenish the fluid in the system, valve 10 will first be closed thereby isolating the hydraulic motor from the remainder of the system and maintaining the hydraulic pressure thereon so that the load on the test sample will not be disturbed. Then the valve 8 will be opened and the pump 4 operated to add fluid to the system thereby raising the plunger 14 of the accumulator until sufficient fluid has been added. When sufficient fluid has been added the valve 8 will again be closed and the valve 10 carefully and slowly opened until the connection is again opened between the accumulator and the fluid motor.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A compressibility tester comprising a stationary test sample ram, a second ram movable toward and away from said test sample ram to compress a test sample positioned therebetween, an expansible and contractible hydraulic motor having a movable element engaging said second ram to move said second ram toward said test sample ram as said motor expands and permit said second ram to retract from said test sample ram as said motor contracts, a weighted gravity actuated hydraulic accumulator comprising a cylinder and piston fitted to each other with a honed fit and adapted to be disposed with their axes vertical in use and with said piston projecting from the upper end of said cylinder and having a weight receiving platform thereon, said accumulator connected to said motor to maintain a predetermined hydraulic pressure therein for urging said second ram toward said test sample ram with a predetermined force, and valve means for closing off hydraulic communication between said motor and said accumulator to permit changing the weighting of said accumulator while maintaining the hydraulic pressure in said motor free from weight impact fluctuations.

2. A compressibility tester in accordance with claim 1 in combination with a hydraulic fluid within said accumulator and motor and connections therebetween comprising a medium rust and oxidation inhibited hydraulic oil containing high molecular weight isobutylene polymer and having a Saybolt viscosity of the order of 500 seconds at 100° F. and of the order of 60 seconds at 210° F.

References Cited in the file of this patent
UNITED STATES PATENTS

| | | |
|---|---|---|
| 292,026 | McDonald | Jan. 15, 1884 |
| 945,992 | Stevens | Jan. 11, 1910 |
| 1,445,963 | La Batt et al. | Feb. 20, 1923 |
| 2,762,294 | Barnes et al. | Sept. 11, 1956 |
| 2,811,038 | Karol | Oct. 29, 1957 |